A. P. LEE.
DUMPING HOPPER.
APPLICATION FILED OCT. 31, 1916.
1,266,500.
Patented May 14, 1918.
5 SHEETS—SHEET 1.
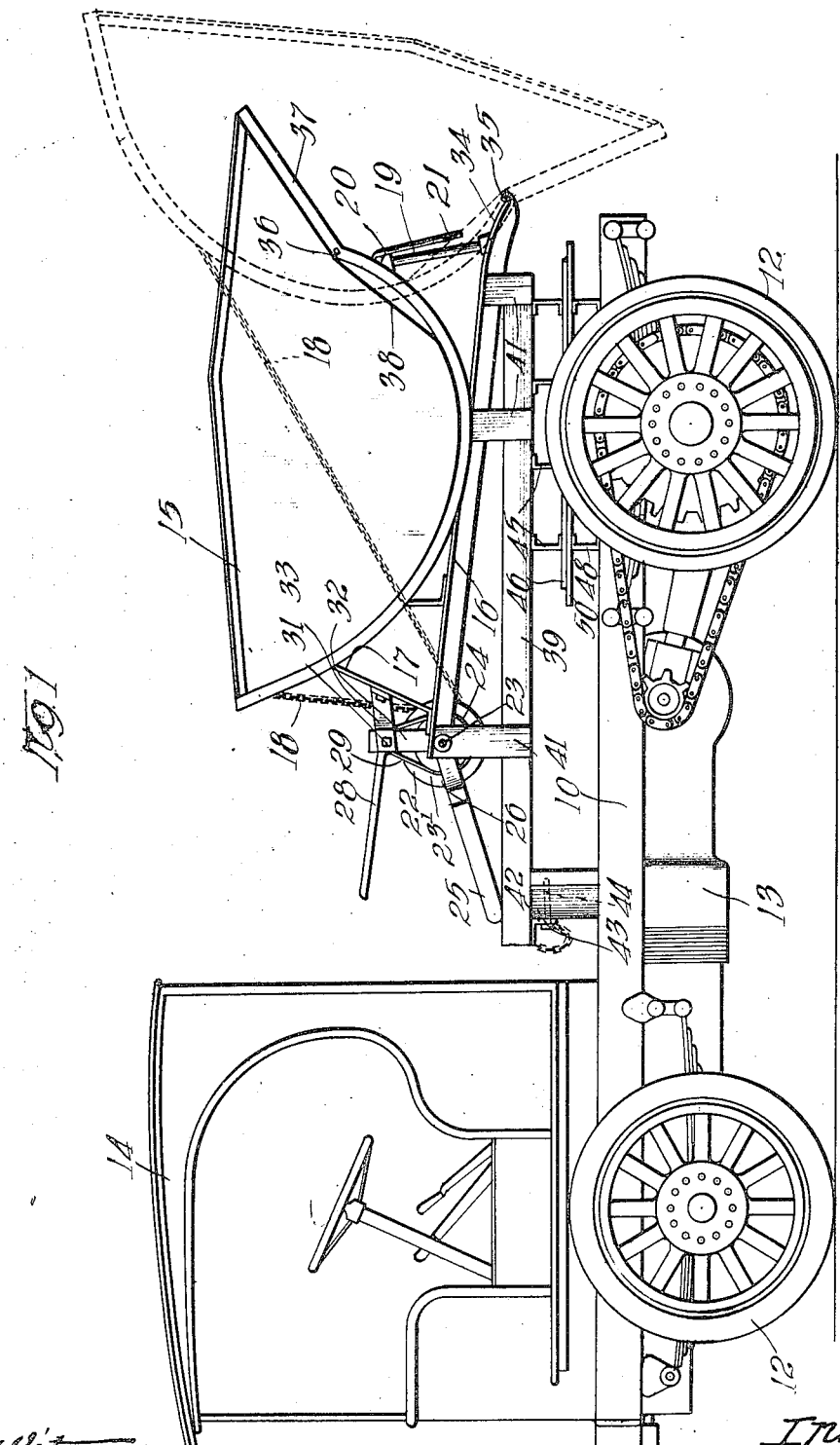

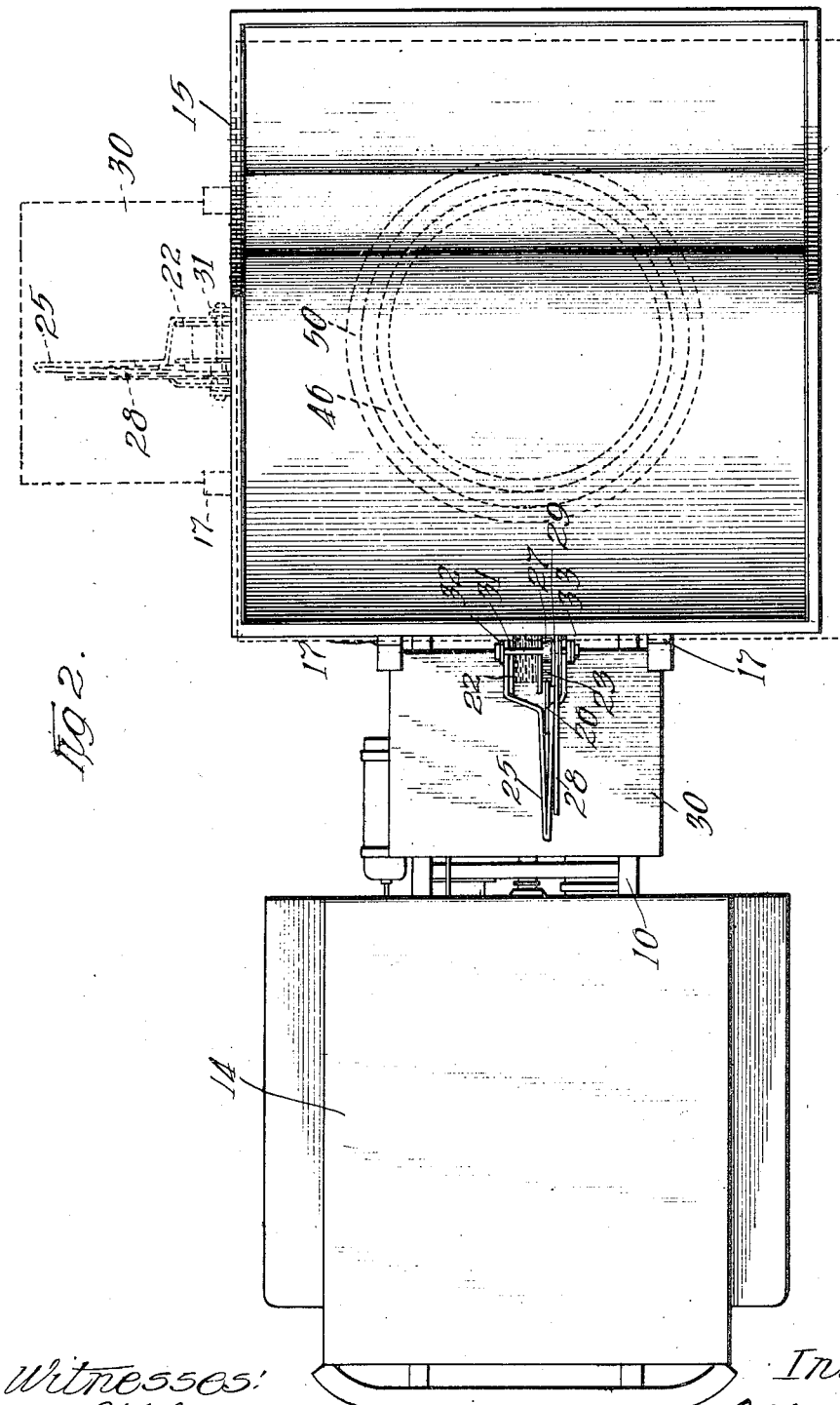

A. P. LEE.
DUMPING HOPPER.
APPLICATION FILED OCT. 31, 1916.
1,266,500.
Patented May 14, 1918.
5 SHEETS—SHEET 3.
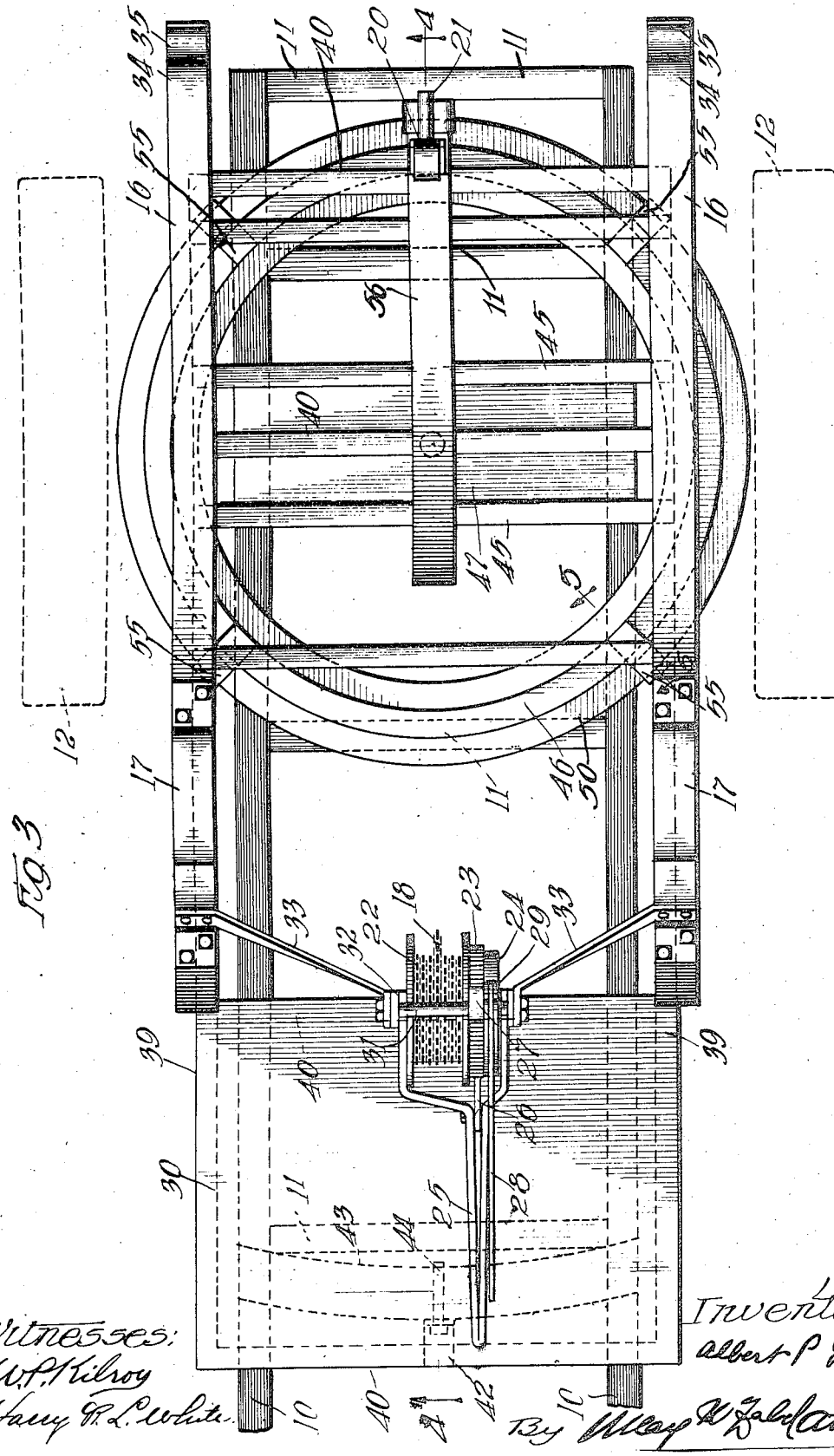

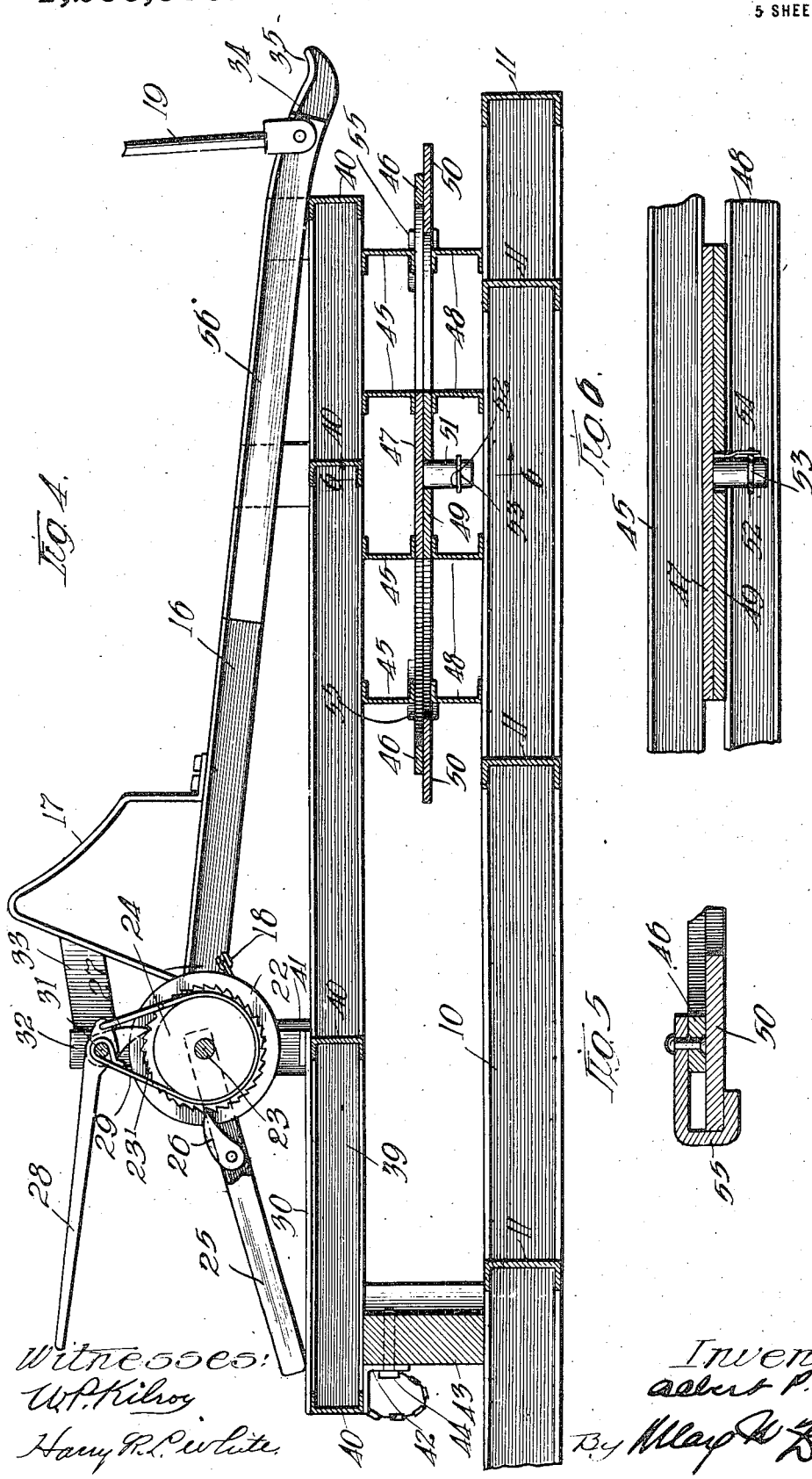

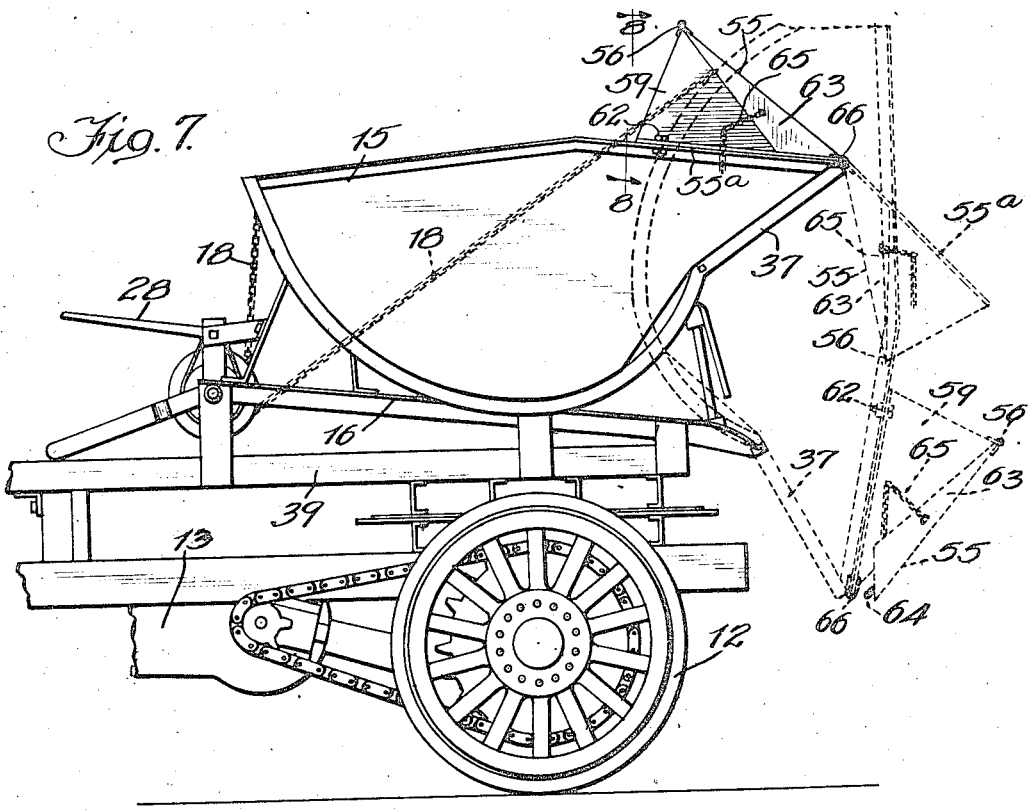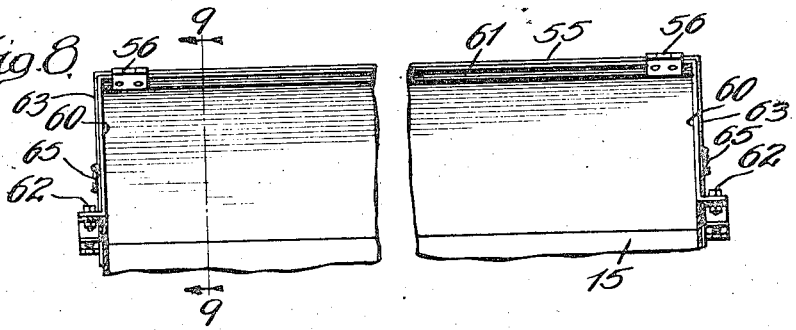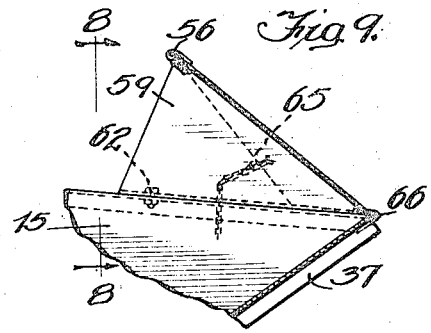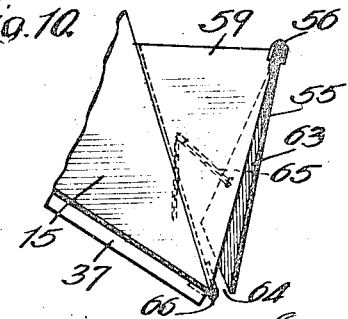

UNITED STATES PATENT OFFICE.

ALBERT P. LEE, OF CHICAGO, ILLINOIS, ASSIGNOR TO LEE LOADER & BODY CO., OF CHICAGO, ILLINOIS.

DUMPING-HOPPER.

1,266,500.  Specification of Letters Patent.  Patented May 14, 1918.

Application filed October 31, 1916. Serial No. 128,692.

*To all whom it may concern:*

Be it known that I, ALBERT P. LEE, a citizen of the United States, residing at Chicago, in the county of Cook and State of Illinois, have invented a certain new and useful Improvement in Dumping-Hoppers, of which the following is a full, clear, concise, and exact description, reference being had to the accompanying drawings, forming a part of this specification.

My invention relates to dumping hoppers, and has for its object the provision of a hopper suitably rolling along a runway from a charge receiving to a discharge position, which runway is carried by a framework rotatable to permit of the hopper occupying various positions to discharge its load to both sides of the center line, and also to the rear. Of course, any intermediate dumping position may be occupied by the hopper, if so desired. For the purposes of this present application, however, I will refer to the hopper more particularly as a three-way dumping hopper, it being assumed that the hopper may discharge the contents rearwardly of the vehicle (if it happens to be mounted on a vehicle) and also to discharge the load upon the opposite sides of the vehicle.

My improved hopper is supported on a sloping runway so that it automatically dumps, and means are provided through the agency of which the hopper may be drawn back into its charge receiving position. My invention further contemplates a practical construction of the hopper outlined which adapts it particularly for this use, and yet permits the hopper to have a large carrying capacity. I might add furthermore that one of the prime advantages resulting from the structure of my invention is the extreme simplicity of the entire apparatus. More especially is this emphasized when it is compared with the present day expensive trucks which my improved structure is designed to replace.

I will describe one form of my invention more in detail by referring to the accompanying drawings illustrating one embodiment thereof, in which—

Figure 1 is a side view of a truck provided with a hopper construction and framework in accordance with my invention;

Fig. 2 is a top view of the same, certain parts being shown by dotted lines in an alternative position;

Fig. 3 is a top view of the rear portion of the structure illustrated in Fig. 1, the hopper itself however being removed;

Fig. 4 is a detail sectional view on line 4—4 of Fig. 3;

Fig. 5 is a detail view along line 5—5 of Fig. 3;

Fig. 6 is a detail sectional view on line 6—6 of Fig. 4;

Fig. 7 is a fragmentary side view of my improved device showing the discharge control structure at the mouth thereof;

Fig. 8 is an end view of the discharge control structure looking in the direction of the arrows 8, 8 of Fig. 9;

Fig. 9 is a cross-sectional view on line 9—9 of Fig. 8, and

Fig. 10 is a longitudinal sectional view of the discharge control mechanism.

Referring more particularly to Figs. 1, 2 and 3, I show a vehicle having a chassis which includes the longitudinal stringers or channels 10, 10 which are suitably held together by the cross braces 11, 11. This chassis has the customary wheels 12, engine 13 and driver's cage 14. The hopper 15 coöperates with an inclined runway having the rails 16, 16. This hopper as more clearly apparent from Fig. 1, is adapted to roll downwardly on this incline into the dotted position shown, thus to discharge the load. As will be apparent later the rails 16 form part of a framework which may be swung about its vertical axis so that the hopper can discharge its contents not only to the rear of the vehicle but at right angles thereto upon opposite sides of the vehicle. The rails 16, 16 are provided with abutments 17, 17 against which the left hand side of the hopper (Fig. 1) abuts when the hopper is in its charge receiving or charge carrying position. When the hopper is in this position it is held by the chain 18 as will presently appear and is furthermore held by the locking structure consisting of the link 19 pivotally carried by a rail 56, which link pivotally carries a cam element 20 having a handle 21, thus to lock the hopper in this position. Whenever it is desired to release the hopper the arm 21 (Fig. 1) is swung contra-clockwise to release this link structure from the hopper, whereupon the chain 18 is permitted to unwind from its support so that the hopper travels to the dotted position of Fig. 1. The hopper is released in this way irrespective of what angular position the framework, including the rails, occupies relative to their vertical axis. The chain 18 is carried by a drum 22, which drum is pivotally mounted upon the shaft 23. The drum likewise is fixedly secured to a ratchet wheel 23' and also to a brake drum 24. An arm 25 carrying a pawl 26 which may engage the teeth of the ratchet wheel 23 is used to wind up the chain and draw the hopper back into its charge carrying position against the abutment 17.

Whenever it is desired to release the hopper, the pawl or dog 26 is withdrawn and a second pawl 27 carried by the arm 28 is permitted to enter the teeth of this ratchet wheel. Normally this pawl 27 acts as a holding pawl during the operations of the handle 25, this action resulting from its being held normally in the position of Fig. 4. The arm 28 also controls a brake band 29, which brake band includes the brake drum 24. Thus when the dog 26 is released the arm 28 (Fig. 4) may be moved contra-clockwise to release the pawl 27 from the ratchet wheel 23'. This slightly applies the brake, thus permitting the hopper to discharge slowly. The rapidity of movement of the hopper may of course further be controlled by tightening the brake band due to swinging the arm 28, if such is desired. A platform 30 which forms part of the auxiliary framework carrying the rails 16, presently to be described, furnishes the place for the operator of the mechanism. The shaft 23 as also the shaft 31' are carried by the vehicle framework 32 supported on this auxiliary framework. This vehicle framework 32 is preferably reinforced so as to be securely held by the arms 33, 33, which arms may preferably project from the abutment structure 17. The rails 16 are likewise provided with more abruptly inclining sections 34 at their extremities which terminate in fingers 35 adapted to coöperate with pins 36 carried by the hopper itself, thus to permit a pivotal movement about these pins 36 into the complete discharge position as shown by dotted lines in Fig. 1. The hopper as thus described has a rounded bottom surface throughout at least three-fourths of its bottom, the remaining fourth consisting of an angular snout 37 which preferably extends in a straight line. A false bottom 38 is likewise provided to facilitate discharge. The rounded surface of the hopper bottom to the left of the center line of the hopper of course does not come into consideration so far as the coöperation between the hopper and the rails is concerned, and this may have any particular design consistent with the maximum capacity and balancing characteristics of the hopper.

As before stated, the framework which includes the rails 16 and the instrumentalities for retaining the hopper is rotatable about a vehicle axis and this framework consists of the skeleton structure comprising the longitudinal stringers or channels 39 and the cross channels 40. This skeleton framework supports the upright structure 32 and carries the platform 30 and also carries the uprights 41 by means of which the rails or runways 16 are fastened to the skeleton framework. This skeleton framework at its forward end carries a depending bracket 42 which coöperates with a strut 43 carried by the chassis so that a pin 44 may maintain this framework in its central position. This auxiliary framework carrying the hopper is supported however along a central axis substantially in line with the rear wheels so that no weight except during the movement of the vehicle need be carried by the strut 43 preferably for balancing purposes.

This auxiliary framework has four cross channels 45, 45 secured to the channels 39, which cross channels are rigidly secured to a ring 46 and also to a central flat plate 47. The channels 10 also have a corresponding number of cross channels mounted on top thereof, respectively the channels 48. These channels 48 also may support a central platform 49 and also carry an annular ring 50. The ring 46 rests upon the ring 50, the two serving as sort of a turn table. In like manner, the plate 47 may swing around on top of the plate 49. A pin 51 depending from the plate 47, passes through a hole in the plate 49 to keep the plates alined. A two fingered catch 52 pushed into the groove 53 of the pin 51 and held in place by the spring 54 keeps the parts in their relative positions to avoid any displacement there may be during jars or bumps. The rings 46 and 50 likewise prevent tilting of the entire auxiliary framework due to fingers 55 shown more clearly in Fig. 5, which fingers are four in number and fastened to the ring 46. These fingers are hooked around the outer extremity of the ring 50 and thus keep the rings 46 and 50 in sliding contact.

In Fig. 2 the dotted lines show the auxiliary framework swung at right angles so that the hopper may discharge on the left hand side of the vehicle. As is more apparent from Figs. 3 and 4, the three rails 16, 16 and 56 form a secure support for the hopper.

Referring more particularly to Figs. 7, 8, 9 and 10, I show more in detail my improved structure with the addition of the spreading device, the object of which is to make it possible to have the hopper spread the contents over a considerable area. Under these conditions the vehicle is moving forward as the hopper is rotating clockwise or rather, as the hopper is rolling down the rail 16. It will be understood of course that the hopper 15 when once released with the release of the chain 18 rolls automatically into its dumping or dotted position of Fig. 7. In order to spread the material evenly throughout a greater area over which the vehicle is traveling during the course of this dumping operation of the hopper, I provide a pocket structure consisting of the lid 55, which lid is hinged at 56 to a framework 59. This framework 59 has the two sides 60, 60 and a cross piece 61 at the top thereof, this framework being bolted to the hopper by the bolts 62. This framework is substantially C-shaped. The lid 55 has the downwardly extending sides 63 so that when the lid is in the closed position of Fig. 7 and Fig. 9, a pocket is formed at the right hand extremity of the hopper directly above the snout 37 entirely closing the upper portion thereof. As will be apparent from the dotted illustration of Fig. 7 when the hopper is completely dumped the lid 55 is in an open position permitting a certain amount of material to fall out through the open mouth 64. The sides 63, 63, at the same time prevent sidewise escape of the confined material. Chains 65 limit the opening permitted at the mouth 64.

Assume now that the hopper is fully loaded and occupies the position shown in full lines in Fig. 7. The construction is such that there is a tendency for the hopper to roll down the rail 16 under these conditions. As soon as the chain 18 is released to thereby permit the hopper to roll then the materials are immediately thrown toward the right to fill the entire pocket, thus further carrying the center of gravity to the right and tending to tilt the hopper to its complete discharge position. During all this time only such an amount of material may escape from the hopper as is permitted to pass through the open mouth 64. During all this dumping operation the vehicle is moving toward the left and the hopper is continually discharging a substantially uniform amount of material, thus spreading it uniformly over a considerable area. My invention makes it possible to thus get a uniform distribution with hoppers of the automatic dump variety. When hoppers are dumped by power or when mechanical means are used to control the degree of tilting the hopper is controlled in all of its positions. However, it is highly desirable in automatically dumping hoppers likewise to have this even distribution of discharge. These automatically dumping hoppers of course have an impetus due to a displaced center of gravity which tends to carry them into the discharge position. If restraining means are then provided without permitting the material to pile up the hopper may reach a position of equilibrium before it is fully dumped. With my present invention however this difficulty is avoided.

I also show in dotted lines at 55ª the entire pocket structure as being moved out of position during the loading of the hopper, this entire pocket structure being suitably pivoted to the hopper at 66.

From what has been thus described the nature of my invention will be readily clear to those skilled in the art.

Having however thus described one form which my invention may take, what I claim as new and desire to secure by Letters Patent is:

1. A device of the character described comprising a runway, a hopper adapted to roll on said runway from its charge carrying to its discharge position, said hopper having a wide, substantially flat, discharge edge running throughout substantially the entire width of the said hopper, and a pocket structure having a discharge mouth provided along the discharge edge of said hopper, said pocket structure having means whereby during the dumping operation a restricted opening is afforded to permit the material to be discharged in a steady stream along the discharge edge of said hopper.

2. A device of the character described comprising a runway, a hopper adapted to roll on said runway from its charge carrying to its discharge position, said hopper having a wide, substantially flat, discharge edge running throughout substantially the entire width of the said hopper, a pocket structure having a discharge mouth provided along the discharge edge of said hopper, said pocket structure having means whereby during the dumping operation a restricted opening is afforded to permit the material to be discharged in a steady stream along the discharge edge of said hopper, and a vehicle upon which said hopper is mounted whereby said vehicle may be moved forwardly during the discharge operation, thereby to spread the material discharged over a predetermined area.

3. A device of the character described comprising a runway, a hopper adapted to roll on said runway from its charge carrying to its discharge position, said hopper having a wide, substantially flat, discharge edge running throughout substantially the entire width of the said hopper, and a pocket structure having a discharge mouth provided along the discharge edge of said hopper, said pocket structure having means whereby during the dumping operation a restricted opening is afforded to permit the material to be discharged in a steady stream along the discharge edge of said hopper, said pocket structure having reservoir means whereby during the discharge operation the material may be temporarily held until completely discharged.

4. A structure of the character described comprising a framework, an auxiliary framework rotatably mounted upon said first aforesaid framework, an inclined runway upon said auxiliary framework, a rolling hopper adapted to roll upon said runway from a charge carrying to a discharge position, the rotatable mounting of said auxiliary framework permitting said hopper to discharge its contents in a plurality of different directions, means at the discharge end of said hopper for locking said hopper in its charge carrying position, means to control the speed of the discharge movement of the hopper, a turn table having coöperating parts held in sliding engagement interposed between said frameworks, means for holding said auxiliary framework in its central position relative to said first aforesaid framework, and means including a winding drum for restoring said hopper from its discharge to its charge carrying position.

5. A structure of the character described comprising a framework, an auxiliary framework rotatably mounted upon said first aforesaid framework, an inclined runway upon said auxiliary framework, a rolling hopper adapted to roll upon said runway from a charge carrying to a discharge position, the rotatable mounting of said auxiliary framework permitting said hopper to discharge its contents in a plurality of different directions, a turn table having coöperating parts held in sliding engagement interposed between said frameworks, means for holding said auxiliary framework in its central position relative to said first aforesaid framework, and means including a winding drum for restoring said hopper from its discharge to its charge carrying position.

6. A structure of the character described comprising a framework, an auxiliary framework rotatably mounted upon said first aforesaid framework, an inclined runway upon said auxiliary framework, a rolling hopper adapted to roll upon said runway from a charge carrying to a discharge position, the rotatable mounting of said auxiliary framework permitting said hopper to discharge its contents in a plurality of different directions, means at the discharge end of said hopper for locking said hopper in its charge carrying position, a turn table having coöperating parts held in sliding engagement interposed between said frameworks, means for holding said auxiliary framework in its central position relative to said first aforesaid framework, and means including a winding drum for restoring said hopper from its discharge to its charge carrying position.

7. A structure of the character described comprising a framework, an auxiliary framework rotatably mounted upon said first aforesaid framework, an inclined runway upon said auxiliary framework, a rolling hopper adapted to roll upon said runway from a charge carrying to a discharge position, the rotatable mounting of said auxiliary framework permitting said hopper to discharge its contents in a plurality of different directions, means to control the speed of the discharge movement of the hopper, a turn table having coöperating parts held in sliding engagement interposed between said frameworks, means for holding said auxiliary framework in its central position relative to said first aforesaid framework, and means including a winding drum for restoring said hopper from its discharge to its charge carrying position.

In witness whereof, I hereunto subscribe my name this 27th day of Sept., A. D. 1916.

ALBERT P. LEE.

Witnesses:
 HAZEL A. JONES,
 MAX W. ZABEL.